(12) United States Patent
Herter

(10) Patent No.: US 9,922,581 B2
(45) Date of Patent: Mar. 20, 2018

(54) LUMINOUS ELEMENT ARRANGEMENT FOR THE DYNAMIC DISPLAY OF A MACHINE-READABLE CODE

(71) Applicant: TRIDONIC GMBH & CO KG, Dornbirn (AT)

(72) Inventor: Jens Herter, Lindau (DE)

(73) Assignee: TRIDONIC GMBH & CO KG (AT)

( * ) Notice: Subject to any disclaimer, the term of this patent is extended or adjusted under 35 U.S.C. 154(b) by 0 days.

(21) Appl. No.: 15/503,066

(22) PCT Filed: Aug. 13, 2015

(86) PCT No.: PCT/EP2015/068652
§ 371 (c)(1),
(2) Date: Feb. 10, 2017

(87) PCT Pub. No.: WO2016/034385
PCT Pub. Date: Mar. 10, 2016

(65) Prior Publication Data
US 2017/0236454 A1   Aug. 17, 2017

(30) Foreign Application Priority Data

Sep. 4, 2014  (DE) .................. 10 2014 217 692

(51) Int. Cl.
*G09F 3/00* (2006.01)
*G09F 9/33* (2006.01)
(Continued)

(52) U.S. Cl.
CPC ...... *G09F 3/0297* (2013.01); *G06K 19/06112* (2013.01); *G06K 19/0723* (2013.01);
(Continued)

(58) Field of Classification Search
CPC .......... G09F 3/0297; G09F 3/208; G09F 9/33; G06K 19/06112; G06K 19/0723; H04L 12/2803
See application file for complete search history.

(56) References Cited

U.S. PATENT DOCUMENTS 6,266,569 B1 * 7/2001 Shapiro .................. B82Y 10/00
                                                        700/1
7,558,648 B2 * 7/2009 Hoglund .............. F24F 11/0012
                                                        165/201
(Continued)

FOREIGN PATENT DOCUMENTS

DE    102010050192    5/2012
DE    202012102486    8/2012
(Continued)

OTHER PUBLICATIONS

German search report in parent German application DE 10 2014 217 692.1 dated Mar. 13, 2015.
(Continued)

*Primary Examiner* — Daniel Walsh
(74) *Attorney, Agent, or Firm* — Andrus Intellectual Property Law, LLP

(57) ABSTRACT

The invention relates to a luminous element arrangement (A), in particular a luminous element field, comprising a plurality of luminous elements, at least one communication interface (5), in particular a bus and/or radio interface, and a converter unit (2), said converter unit (2) activating and/or deactivating the plurality of luminous elements of the luminous element arrangement (A) in response to a signal received via the communication interface (5) such that in top view onto the luminous element arrangement (A) a machine-readable code, in particular a one-dimensional or two-dimensional, machine-readable code is represented.

12 Claims, 1 Drawing Sheet

(51) Int. Cl.
*G09F 3/20* (2006.01)
*G06K 19/06* (2006.01)
*G06K 19/07* (2006.01)
*H04L 12/28* (2006.01)

(52) U.S. Cl.
CPC .............. *G09F 3/208* (2013.01); *G09F 9/33* (2013.01); *H04L 12/2803* (2013.01)

(56) References Cited

U.S. PATENT DOCUMENTS

| | | | |
|---|---|---|---|
| 9,806,712 B2* | 10/2017 | Smith | H03K 17/962 |
| 2002/0014972 A1* | 2/2002 | Danielson | H05B 37/02 |
| | | | 340/815.4 |
| 2004/0267385 A1* | 12/2004 | Lingemann | G05B 15/02 |
| | | | 700/83 |
| 2005/0023996 A1* | 2/2005 | Adamson | H05B 37/0245 |
| | | | 315/293 |
| 2006/0001683 A1* | 1/2006 | May | H04L 67/125 |
| | | | 345/661 |
| 2007/0293208 A1* | 12/2007 | Loh | H04L 12/282 |
| | | | 455/419 |
| 2009/0243517 A1* | 10/2009 | Verfuerth | H05B 37/0272 |
| | | | 315/315 |
| 2010/0035546 A1* | 2/2010 | Simons | G01S 5/0289 |
| | | | 455/41.2 |
| 2011/0178650 A1* | 7/2011 | Picco | H05B 33/0863 |
| | | | 700/295 |
| 2012/0242254 A1* | 9/2012 | Kim | H05B 37/0254 |
| | | | 315/312 |
| 2013/0054033 A1* | 2/2013 | Casilli | H04L 12/282 |
| | | | 700/276 |
| 2013/0071029 A1 | 3/2013 | Terwilliger et al. | |
| 2013/0209108 A1* | 8/2013 | Krishnakumar | H04L 69/14 |
| | | | 398/130 |
| 2013/0228624 A1* | 9/2013 | Byrd | H04B 10/116 |
| | | | 235/462.11 |
| 2013/0261804 A1* | 10/2013 | Casilli | H04L 12/282 |
| | | | 700/276 |
| 2013/0268127 A1* | 10/2013 | Casilli | G05D 23/19 |
| | | | 700/276 |
| 2013/0268128 A1* | 10/2013 | Casilli | G05D 23/19 |
| | | | 700/276 |
| 2013/0289750 A1* | 10/2013 | Souvay | H05B 37/0263 |
| | | | 700/90 |
| 2014/0173289 A1* | 6/2014 | Casilli | H04L 12/282 |
| | | | 713/185 |
| 2014/0186048 A1* | 7/2014 | Oshima | H04B 10/541 |
| | | | 398/118 |
| 2014/0358285 A1* | 12/2014 | Aggarwal | G05B 15/02 |
| | | | 700/275 |
| 2015/0156030 A1* | 6/2015 | Fadell | H04L 12/2816 |
| | | | 700/90 |
| 2015/0156031 A1* | 6/2015 | Fadell | H04L 12/2816 |
| | | | 700/276 |
| 2016/0085884 A1* | 3/2016 | Schafer | H05B 37/0272 |
| | | | 703/1 |
| 2016/0086045 A1* | 3/2016 | Roberts | G06K 9/3216 |
| | | | 382/183 |
| 2016/0223395 A1* | 8/2016 | Cohn | G05B 15/02 |
| 2016/0342297 A1* | 11/2016 | Ellwood | G09G 5/12 |
| 2016/0342701 A1* | 11/2016 | Sung | H05B 37/0272 |
| 2017/0201579 A1* | 7/2017 | Peixoto Guimaraes Ubirajara e Silva | H04L 67/1095 |

FOREIGN PATENT DOCUMENTS

| | | |
|---|---|---|
| DE | 102011082415 | 3/2013 |
| DE | 202013001191 | 4/2013 |
| EP | 2199944 | 6/2010 |
| JP | H0695599 | 4/1994 |

OTHER PUBLICATIONS

PCT search report, PCT application PCT/EP2015/068652 dated Nov. 17, 2015.
Austria search report in co-pending Austria application GM 377/2014 dated Jun. 6, 2016.

* cited by examiner

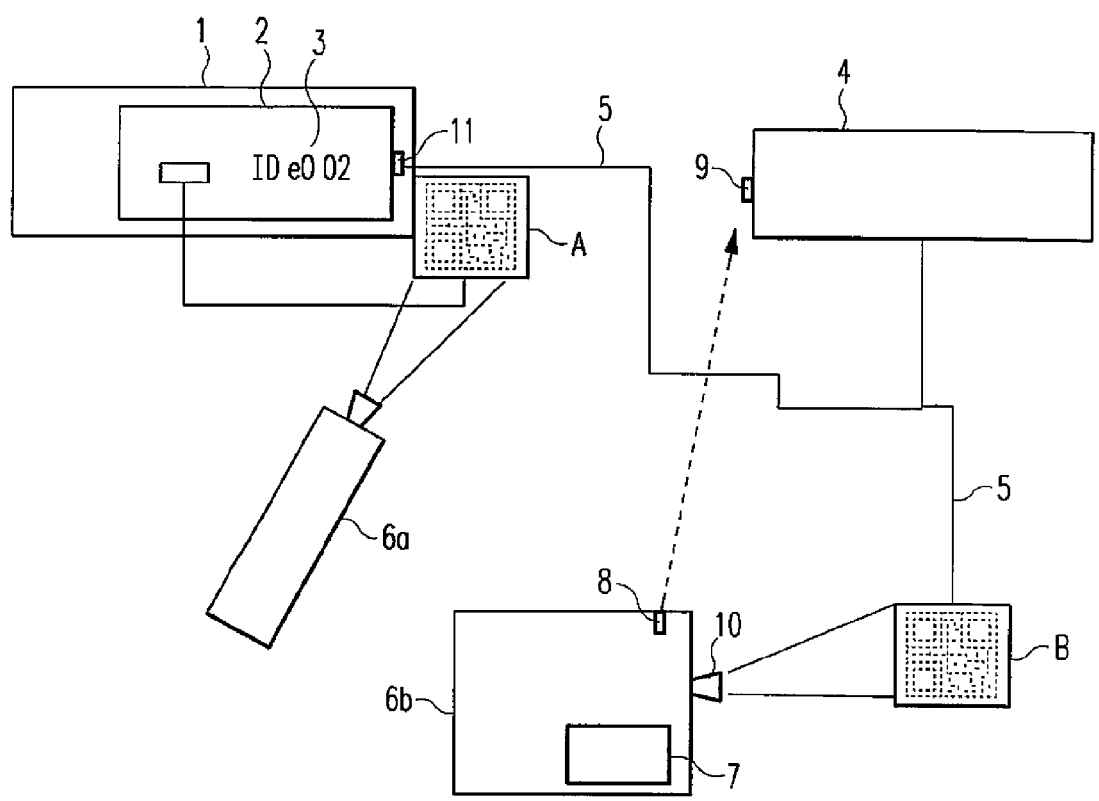

LUMINOUS ELEMENT ARRANGEMENT FOR THE DYNAMIC DISPLAY OF A MACHINE-READABLE CODE

CROSS REFERENCE TO RELATED APPLICATION

The present application is the U.S. national stage application of International Application PCT/EP2015/068652, filed Aug. 13, 2015, which international application was published on Mar. 10, 2016 as International Publication WO 2016/034385 A1. The International Application claims priority to German Patent Application 10 2014 217 692.1, filed Sep. 4, 2014.

FIELD OF THE INVENTION

The invention relates to a luminous element arrangement for the dynamic display of a machine-readable code, and in particular, a luminous element field, comprising a plurality of luminous elements, e.g. LEDs, for displaying such a machine-readable code. Furthermore, the invention relates to a system having at least one such luminous element arrangement, in which the luminous element arrangement visually depicts parameters (operating and/or configuration parameters) of the system, preferably in the form of a machine-readable code. The luminous element arrangement can be a participant in a lighting and/or building technology system.

BACKGROUND OF THE INVENTION

Machine-readable codes are known. The most widely known representatives thereof are barcodes (or bar codes, stripe codes, line codes), such as those used on many products. Known formats for such barcodes are EAN, UPC, IAN, JAN and codes from the 2/5 family, as well as codes in accordance with Code 39, Code 93, Codebar, Code 128, etc.

Moreover, "two-dimensional" (2D) barcodes are also known, which correspond, for example, to the code block format of Code 49, PDF417, or other formats in which encoded data can be resolved along two dimensions. Known two-dimensional codes are matrix codes, such as, e.g. Data Matrix codes, MaxiCodes, or the Aztec Code. Especially since 1994, the QR code is also a known representative of the 2D code, because it can encode a large amount of data, and also contains an error correction. It is also advantageous that QR codes can be used without licensing costs.

SUMMARY OF THE INVENTION

In particular in lighting and building technology systems, there is often the need to read out and/or modify parameters of the system, or a participant thereof. The luminous element arrangement and the system offer a solution for this need. The invention relates to a luminous element arrangement and a system as described herein.

In a first aspect, a luminous element arrangement is provided, in particular a luminous element field, having numerous luminous elements, at least one communication interface, in particular a bus and/or radio interface, and a converter unit, wherein the converter unit activates and/or deactivates the numerous luminous elements of the luminous element arrangement, depending on a signal received via the communication interface, such when viewed from above, the luminous element arrangement depicts a machine-readable code, in particular a one- or two-dimensional machine-readable code.

The machine-readable code can be a QR code.

The machine-readable code can encode at least one parameter, which is received with the signal from the luminous element arrangement. Preferably, a control unit is thus provided in the converter unit, which converts the signal, received for example via a bus, into a code format, and causes the corresponding activation of the luminous element. The externally received signal preferably authorizes the necessary activation of the luminous element for depicting the code indirectly, even when it is fundamentally possible in accordance with the invention that the signal authorizes this code depiction directly.

The luminous element arrangement can be functionally connectable to a lighting and/or building technology system via the communication interface. The machine-readable code can encode operating and/or configuration parameters of the system in question, and/or system participants of the respective system.

The operating and/or configuration parameters may be parameters of a luminous element operating device.

In another aspect of the invention, a luminous element arrangement (A) is provided, having:
 luminous elements,
 at least one communication interface (11), in particular a bus and/or radio interface, and
 a converter unit (2), wherein the converter unit (2) is designed to activate lighting actions of the luminous elements.

Further luminous elements can preferably be connected thereby to an interface of the luminous element arrangement, in a manner that can be disconnected, (e.g. only during the installation phase), which can be operated by the converter unit such that, when the luminous element arrangement (A) is viewed from above, a machine-readable code, in particular a one- or two-dimensional machine-readable code, is depicted by the further luminous elements.

In yet another aspect, a system is provided, having a luminous element arrangement as described above, with an additional communication interface, in particular a radio interface. It can be configured to receive operating and/or configuration parameters, in particular from a mobile communication device.

The mobile communication device can be a component of the system. The mobile communication device can be configured to receive a machine-readable code depicted by the luminous element arrangement, to extract, and in particular modify, operating and/or configuration parameters therefrom, and to send the operating and/or configuration parameters to the other communication interfaces.

The system can evaluate the operating parameters and/or configuration parameters received via the other communication interfaces, and output these to system participants.

The system can be a lighting system and/or a building technology system.

The operating and/or configuration parameters received via the other interface may be used by a control unit that is provided, in particular a central processing unit, in order to set operating and/or configuration parameters in system participants connected to the system.

At least one system participant can send operating and/or configuration parameters to the luminous element arrangement. The luminous element arrangement can set or modify the depiction of the machine-readable code in response thereto.

The mobile communication device can comprise at least one means for registering the machine-readable code, in particular a camera, and an interface for communication with the other communication interface, in particular a WLAN/WiFi, a Bluetooth, a USB, and/or a mobile data communication interface.

The central control unit can evaluate the operating and/or configuration parameter received via the other communication interface, and output corresponding operating and/or configuration parameters to the participants of the system.

The operating and/or configuration parameters may comprise at least one identifier, which identifies a participant of the system, the operating and/or configuration parameters of which are to preferably be set.

The mobile end device can comprise a software, which enables a decoding of the machine-readable code.

In another aspect, a method is provided for setting operating and/or configuration parameters of a system participant of a system, in particular a lighting and/or building technology system, wherein an operating and/or configuration parameter is depicted, indicating a state of the system participant in the form of a machine-readable code through a luminous element arrangement, in particular a luminous element field. The machine-readable code can be registered and evaluated by a mobile communication device, by means of which the depicted operating and/or configuration parameters are made available in the communication device. The operating and/or configuration parameters can be transmitted from the communication device to the system, wherein the operating and/or configuration parameters of the system participant, in particular, are set, based on the transmitted operating and/or configuration parameters.

BRIEF DESCRIPTION OF THE DRAWINGS

The invention shall now also be described with reference to the FIGURE.

FIG. 1 shows a schematic and exemplary depiction of a system according to the invention.

DETAILED DESCRIPTION

The luminous element arrangement according to the invention, which can be provided in particular in the form of a display device or a display unit, has, according to the invention, a communication interface, via which data can be supplied to the luminous element arrangement. This data contains data, in particular encoded in the form of a barcode (one-dimensional or two-dimensional barcode), that is to be depicted by the luminous element arrangement.

If the display device is connected to a building technology or lighting system, then data can be transmitted to the display device containing the operating and/or configuration parameters of the respective system or its participants. These are then depicted in an encoded form by the luminous element arrangement.

The communication interface of the display device can be a bus interface thereby, with which the luminous element arrangement can be connected to a building technology system bus or lighting system bus (e.g. a DALI or DSI bus).

The luminous element arrangement thus registers at least one signal, and depending thereon, depicts a corresponding machine-readable code by means of luminous elements of the luminous element arrangement. The luminous element arrangement can comprise a converter unit for this, which is functionally connected to the interface of the luminous element arrangement and the luminous elements. The converter unit then converts the signal received via the interface, and activates the luminous elements of the luminous element arrangement.

Alternatively, the converter unit can also convert the desired data into control data appropriate for an activation circuitry. The converter unit can furthermore be configurable, and select, e.g. a selection of parameters that are to be depicted, selectively. The generated machine-readable code can then be read out by a device, in particular a mobile communication device.

On one hand it is possible to scan the machine-readable code depicted by the display device with a barcode reader developed especially for this, which then, in particular, decodes the machine-readable code. This device can then make the parameters encoded by the machine-readable code available, such that they can be modified, for example, by a user via a user interface.

The modified parameters can then be transmitted via a further communication interface to the system (building technology or lighting system), in order to thus input modified configuration or operating parameters to the system. One parameter depicted by the luminous element arrangement is, in particular, an identifier, which identifies a participant of the system with the depicted data. This identifier can then also be transmitted with the data transmitted from the communication device to the system. In this manner, a modification of the parameters of the participant associated with the identifier can occur.

A central control unit, in particular, can then register these modified parameters, and carry out appropriate adjustments in order, in particular, to configure participants of the system accordingly. In response to the modifications, the depiction of the machine-readable code can then be modified appropriately by transmitting modified operating and/or configuration parameters to the luminous element arrangement. The converter unit has a system address, and can thus be addressed, in particular by the central control unit.

As a matter of course, however, it is also possible to register the corresponding machine-readable code by means of another mobile communication device, e.g. a smartphone, a tablet, . . . . For this, a software component is provided on the mobile communication device, which enables the machine-readable code to be registered and evaluated accordingly, e.g. via the camera of the mobile communication device, and make the encoded parameter available in the mobile communication device. The software components can then depict a user interface, via which the corresponding parameter can be modified in the communication device by means of an input interface of the mobile communication device. The input interface can be, in particular, a touch sensitive display screen (touchscreen) thereby. It is also possible, however, to modify the parameter by other means that are suitable for user input (e.g. keypad or mouse).

Most mobile communication devices have at least one other communication interface (e.g. interfaces for wireless networks such as WLAN, Bluetooth, Zig Bee, . . . ). The modified parameter is then transmitted to the system via this further communication interface, which has an appropriately designed corresponding interface (WLAN, Bluetooth, Zig Bee).

Another application can be established for the dynamic luminous element assembly in the field of emergency lighting devices.

Thus, an emergency lighting device can be designed with a corresponding luminous element assembly, thus displaying data regarding a status (e.g. battery or rechargeable battery capacity, but also, e.g., a luminous element state). By way of example, the result of a self-testing of the emergency lighting device can be depicted in an encoded form by the dynamic display.

It is possible thereby, that the luminous element assembly can only be activated selectively. By way of example, a button/switch may be provided on an emergency lighting device, with which the dynamic luminous element arrangement can be activated temporarily. It is also possible that the luminous element arrangement on an emergency lighting device or a building/lighting system, or participant, is only operated during an installation/configuration phase, in order to be able to read out and set corresponding parameters (e.g. participant addresses). Subsequently, the luminous element assembly can be deactivated, in particular via the bus, or it can be disconnected from the bus, when it is designed as a separate display unit. The machine-readable code, in particular the QR code, is preferably depicted, respectively, by means of an LED matrix or individual LEDs, substantially in the form of a matrix arrangement.

In particular, the system comprises a central control unit, which is capable of transmitting commands to the luminous element arrangement. By way of example, the states of lamps, sensors or switches can also then be depicted by means of the luminous element arrangement. One possibility for attaching the luminous element arrangement comprises attaching the display in or near a switch or a lamp.

FIG. 1 shows, by way of example, a design of an exemplary embodiment. At least one luminous element arrangement A in the form of a dynamic display unit, or a display device, is provided here in a space. In addition, a lamp 1, for example, likewise comprises a luminous element arrangement, which can display a state of the lamp, or its configuration or operating parameter. The lamp serves as an example here for a system participant The lamp comprises, in particular, a converter unit 2, which is provided with an address. It is then possible for a control circuitry of the lamp to register configuration or operating parameters of the lamp, and to transmit these to the converter unit 2. This can be addressed via an address 3, ID e0 02 in the example, by preferably a central control unit 4, via a bus 5.

The converter unit 2 then converts the data received from the control unit 4 in order for it to be depicted by the luminous element arrangement A, such that the luminous element arrangement A on the lamp 1 then depicts a corresponding machine-readable code.

As a matter of course, it is also possible for more than one display unit to be provided. Thus, by way of example, a further luminous element arrangement B may be provided, which is positioned at another location in the space, for example, which may be more easily accessed.

The luminous element assembly B also has a corresponding generator (not shown) for generating a machine-readable code. The converter unit likewise has an operating address for addressing, and can be addressed by the control unit 4, in particular a central control unit. The central control unit 4 can thus transmit corresponding data, or signals, respectively, to the further luminous element arrangement B, by means of which a corresponding machine-readable code can be generated by the code generator, and displayed by the luminous element arrangement.

By way of example, it is possible for the lamp 1 to transmit configuration and/or operating parameters to the central control unit 4, and in response thereto, the central control unit 4 addresses the luminous element arrangement B by means of the operating address 3 of the code generator of the luminous element arrangement B, and thus generates a correspondingly encoded depiction of the configuration and/or operating parameter of the lamp 1 by the display unit B.

Other mobile communication devices 6a, 6b are shown in the example, which are capable of registering and decoding the machine-readable code depicted by the respective luminous element arrangement A, B, and making the corresponding depicted parameters available in the device 6a, 6b.

The mobile communication device 6b is provided with a user interface 7 thereby, via which the parameters can be modified. In addition, the mobile communication device 6b has an interface 8, which enables communication with the central control unit 4. This can occur, in particular, by means of wireless communication, as is also indicated by the broken-lined arrow. The control unit 4 then has a corresponding communication interface 9. The mobile communication devices 6a, 6b may be equipped thereby, in particular, with a camera 10 in each case, which serves to register the machine-readable code.

In particular through the attachment of the luminous element arrangement to building technology devices or device participants of a lighting system, it is possible to depict an identifier of the respective system participant. In this manner, a simple localization of the participant, or position determination, can occur, in particular in the installation/commissioning of the participant.

For this, the encoded identifier data depicted by means of the luminous element arrangement can be read out, e.g. on a mobile communication device 6b, and linked to a position. This positioning can occur by means of a positioning unit (not shown) present in the mobile communication device 6b (e.g. a GPS or GLONASS receiver), which determines a position, either automatically, or on the basis of a user input.

The respective converter unit need not be connected to the control unit via a bus, but rather, an interface 11 can also be designed as a radio, USB, serial, or other type of interface. This interface can also be the luminous element arrangement interface.

What is claimed is:

1. A lighting and building technology system comprising:
a plurality of system participants, each having an address identifying the location of the participant in the system, within a building of the lighting and building technology system;
a central control unit that sets operating and configuration parameters in system participants connected to the system;
at least one lamp which is a system participant;
a converter unit that is adapted to activate the lamp for lighting purposes and also is adapted to encode operating and configuration parameters for the plurality of system participants into a machine-readable code, comprising one of a one-dimensional machine-readable code and a two-dimensional machine-readable code;
at least one communication interface, comprising one of a bus and a radio interface, between the central control unit and the converter unit;
a luminous element field comprising a plurality of luminous elements;
and
wherein the luminous element field is is operated by the converter unit such that when viewed from above, the machine-readable code, comprising one of a one-dimensional machine-readable code and a two-dimensional machine-readable code, is depicted dynamically on the luminous element field; and a mobile communication device is configured to optically scan the machine-readable code depicted on the luminous element field, to extract, and modify, operating and configuration parameters therefrom, and to transmit the modified operating and configuration parameters to the central control unit;

wherein the transmitted operating and configuration parameters received by the central control unit are evaluated in order to set operating and configuration parameters in system participants connected to the system based on the modified operating and configuration parameters; and wherein the mobile communication device further comprises means for determining the positioning of the mobile communication device, and the position of the mobile communication device is linked to the machine readable code when optically scanning by the mobile communication device from the luminous field element.

2. A system according to claim 1, wherein the system has a further communication interface, comprising a radio interface, and the central control unit is configured to receive operating and configuration parameters via the further communication interface, from a mobile communication device.

3. The system according to claim 2, wherein the system evaluates the operating and configuration parameters received via the further communication interface, and outputs evaluation information to system participants.

4. The system according to claim 2, wherein at least one system participant transmits operating and configuration parameters to the converter unit, and the converter unit sets or modifies the machine-readable code in response thereto.

5. The system according to claim 2, wherein the mobile communication device comprises at least one camera for optically scanning the machine-readable code, and an interface for communication with the further communication interface.

6. The system according to claim 2, wherein the operating and configuration parameters comprise at least one identifier, which identifies a participant of the system for which the operating and configuration parameters are set.

7. The system according to claim 2, wherein the mobile communication device comprises software that decodes the machine-readable code and enables modification of the operating and configuration parameters through a user interface.

8. The system according to claim 2 wherein the further communication interface is a WLAN/WiFi interface.

9. The system according to claim 2 wherein the further communication interface is a low power wireless interface.

10. The system according to claim 1 wherein the mobile communication device and the the central control unit communicate via a mobile data communication interface.

11. The system according to claim 1, wherein the luminous element field is removably connected to the system and is activated temporarily when connected to the system to depict the machine readable code dynamically.

12. A method for setting operating and configuration parameters of a system participant in a lighting or building technology system, the method comprising the steps of:

providing a plurality of system participants, each having an address identifying a location of the participant in the system, wherein at least one system participant comprises one of a lamp, a switch or a sensor within a building of the lighting and building technology system;

depicting, via a converter unit, operating and configuration parameters that indicate a state of a selected one of the plurality of system participants on a luminous element field in the form of a machine-readable code, wherein the converter unit activates the selected one of the plurality of system participants;

optically scanning the machine-readable code on a mobile communication device having a camera;

decoding the registered machine readable code so that the depicted operating and configuration parameters are available using the mobile communication device;

modifying the operating and configuration parameters using a user interface on the mobile communication device;

transmitting the modified operating and configuration parameters to the system, in the modified form, from the mobile communication device;

setting the operating and configuration parameters of the selected one of the plurality of system participants based on the transmitted modified operating and configuration parameters and determining, by the mobile communication device, the position of the mobile communication device, and linking the position of the mobile communication device to the machine readable code when optically scanned by the mobile communication device from the luminous field element.

* * * * *